(12) United States Patent
McCahon et al.

(10) Patent No.: US 12,362,531 B2
(45) Date of Patent: Jul. 15, 2025

(54) RAMAN AMPLIFIER WITH SHARED RESONATOR

(71) Applicant: Applied Energetics, Inc., Tucson, AZ (US)

(72) Inventors: Stephen William McCahon, Tucson, AZ (US); Alan Kost, Tucson, AZ (US); Gregory J. Quarles, Tucson, AZ (US)

(73) Assignee: Applied Energetics, Inc., Tucson, AZ (US)

( * ) Notice: Subject to any disclaimer, the term of this patent is extended or adjusted under 35 U.S.C. 154(b) by 645 days.

(21) Appl. No.: 17/655,484

(22) Filed: Mar. 18, 2022

(65) Prior Publication Data

US 2022/0302669 A1    Sep. 22, 2022

Related U.S. Application Data

(60) Provisional application No. 63/163,488, filed on Mar. 19, 2021.

(51) Int. Cl.
| | |
|---|---|
| *H01S 3/108* | (2006.01) |
| *H01S 3/08* | (2023.01) |
| *H01S 3/082* | (2006.01) |
| *H01S 3/094* | (2006.01) |
| *H01S 3/115* | (2006.01) |

(Continued)

(52) U.S. Cl.
CPC ........ *H01S 3/1086* (2013.01); *H01S 3/08054* (2013.01); *H01S 3/094076* (2013.01); *H01S 3/115* (2013.01); *H01S 3/1618* (2013.01); *H01S 3/2325* (2013.01); *H01S 3/235* (2013.01); *H01S 3/30* (2013.01); *H01S 3/082* (2013.01);

(Continued)

(58) Field of Classification Search
CPC ............ H01S 3/1086; H01S 3/30–307; H01S 3/2325; H01S 3/235; H01S 3/233; H01S 3/2341; H01S 3/10092; H01S 3/10084
See application file for complete search history.

(56) References Cited

U.S. PATENT DOCUMENTS

| | | | |
|---|---|---|---|
| 4,048,516 A * | 9/1977 | Ammann | H01S 3/30 |
| | | | 372/3 |
| 4,165,469 A * | 8/1979 | Ammann | H01S 3/30 |
| | | | 372/3 |

(Continued)

FOREIGN PATENT DOCUMENTS

| | | | | |
|---|---|---|---|---|
| CN | 106169696 A | * | 11/2016 | ............. H01S 3/082 |
| CN | 107248695 A | * | 10/2017 | ............. H01S 3/1611 |

(Continued)

*Primary Examiner* — Joshua King
(74) *Attorney, Agent, or Firm* — Martensen IP; Michael C. Martensen

(57) ABSTRACT

A resonating optical amplifier includes a laser pump cavity defined by a first mirror and a second mirror with a laser pump gain medium configured within a first portion of the laser pump cavity and a Raman amplifier within a second portion of the laser pump cavity. A circulating pump-laser light is introduced to the laser pump gain medium forming a pump signal that is configured to bi-directionally propagate along a beam path within the laser pump cavity. The Raman amplifier is positioned in line with the beam path of the pump signal and operable to impart gain on a seed pulse. The seed pulse and the pump signal are co-aligned and linearly polarized.

17 Claims, 11 Drawing Sheets

(51) Int. Cl.
*H01S 3/127* (2006.01)
*H01S 3/16* (2006.01)
*H01S 3/23* (2006.01)
*H01S 3/30* (2006.01)
*H01S 3/10* (2006.01)

(52) U.S. Cl.
CPC ........... *H01S 3/10092* (2013.01); *H01S 3/127* (2013.01); *H01S 3/302* (2013.01)

(56) References Cited

U.S. PATENT DOCUMENTS

| | | | | |
|---|---|---|---|---|
| 4,327,337 A * | 4/1982 | Liu | H01S 3/1086 | 372/20 |
| 4,529,943 A * | 7/1985 | George | H01S 3/305 | 359/334 |
| 4,618,783 A * | 10/1986 | Pradere | H01S 3/30 | 372/3 |
| 4,717,842 A * | 1/1988 | Komine | H01S 3/30 | 372/3 |
| 4,751,714 A * | 6/1988 | Chen | H01S 3/1086 | 372/60 |
| 4,829,528 A * | 5/1989 | Band | H01S 3/30 | 372/3 |
| 4,868,833 A * | 9/1989 | Stultz | H01S 3/1086 | 372/19 |
| 4,933,943 A * | 6/1990 | Narhi | H01S 3/1086 | 372/3 |
| 5,072,135 A * | 12/1991 | Huignard | H01S 3/305 | 372/12 |
| 5,088,096 A * | 2/1992 | Pocholle | G02F 1/39 | 372/55 |
| 5,180,378 A * | 1/1993 | Kung | A61B 18/22 | 606/2 |
| 5,221,988 A * | 6/1993 | Juhasz | H01S 3/235 | 359/254 |
| 5,251,221 A * | 10/1993 | Stultz | H01S 3/305 | 372/101 |
| 5,377,211 A * | 12/1994 | Kong | H01S 3/305 | 372/99 |
| 5,566,195 A * | 10/1996 | Heppner | H01S 3/1086 | 372/3 |
| 5,583,877 A * | 12/1996 | MacPherson | H01S 3/305 | 372/4 |
| 5,673,281 A * | 9/1997 | Byer | H01S 3/1086 | 372/39 |
| 6,021,140 A * | 2/2000 | Clark | H01S 3/1112 | 372/18 |
| 2008/0259969 A1* | 10/2008 | Piper | H01S 3/1086 | 372/20 |
| 2009/0174930 A1* | 7/2009 | McCahon | H01S 3/235 | 359/334 |
| 2010/0054284 A1* | 3/2010 | Dekker | H01S 3/1086 | 372/3 |
| 2011/0249318 A1* | 10/2011 | McCahon | H01S 3/235 | 359/348 |
| 2012/0113994 A1* | 5/2012 | Georges | H01S 3/1086 | 372/3 |
| 2018/0109078 A1* | 4/2018 | Bernier | H01S 3/0092 | |
| 2020/0036155 A1* | 1/2020 | Noach | H01S 3/1118 | |
| 2023/0036257 A1* | 2/2023 | Chen | H01S 3/1611 | |
| 2023/0283035 A1* | 9/2023 | Kost | H01S 3/082 | 372/3 |
| 2024/0186761 A1* | 6/2024 | Mueller | H01S 3/08036 | |

FOREIGN PATENT DOCUMENTS

| | | | | |
|---|---|---|---|---|
| CN | 109149336 A | * | 1/2019 | ........... H01S 3/0675 |
| CN | 110265863 A | * | 9/2019 | |
| CN | 112490836 A | * | 3/2021 | |
| FR | 2542104 A1 | * | 9/1984 | |
| FR | 2689695 A1 | * | 10/1993 | ........... H01S 3/1086 |
| GB | 2266406 A | * | 10/1993 | ............. H01S 3/305 |
| KR | 970005169 B1 | * | 4/1997 | |
| WO | WO-2006032110 A1 | * | 3/2006 | ......... H01S 3/08022 |
| WO | WO-2011103630 A1 | * | 9/2011 | ............... H01S 3/30 |
| WO | WO-2020221852 A1 | * | 11/2020 | ............. G01S 17/00 |

* cited by examiner

RAMAN AMPLIFIER WITH SHARED RESONATOR

RELATED APPLICATION

The present application relates to and claims the benefit of priority to U.S. Provisional Patent Application No. 63/163,488 filed 19 Mar. 2021 which is hereby incorporated by reference in its entirety for all purposes as if fully set forth herein.

BACKGROUND OF THE INVENTION

Field of the Invention

Embodiments of the present invention relate, in general, to Raman amplification of an optical signal and more particularly to resonated Raman amplification of an optical signal.

Relevant Background

A LASER, or Light Amplification by Stimulated Emission of Radiation, is a high-power light harnessed to create a narrow directional beam. At its most basic levels a laser includes a gain medium in an optical cavity. The cavity is defined, in most instances, by a pair of mirrors at either end that reflect light within the cavity. An energy source or pumping energy in the form of photon or electrical energy completes the basic component list.

The gain medium is a set of atoms, molecules, or ions in gaseous, solid, or liquid state that acts to amplify the light. A state in which the number of atoms in the upper energy level is greater than the atoms in the lower energy, or inversion, must exist to form a stimulated emission.

An optical pumping light is often used to create the necessary inversion for a laser. A gain medium absorbs the light from an energy source promoting a portion of the atom population from their ground state to a higher energy state. A material continuously exposed to a pumping light forms a continuous wave while a pulsed wave is formed using flashes.

One known class of amplifying pumps are known as regenerative amplifiers. In such an amplifier light passes multiple times through a single gain medium, or plural gain media, to efficiently extract a gain. In a regenerative amplifier, an optical path is defined in which an input pulse or signal makes several passes before being directed out as an amplified signal. Laser pulses with ultrashort pulse durations in the picosecond or femtosecond ranges can be created using this technique. Multiple passes through the gain medium, such as a solid-state medium, are achieved by placing the gain medium in an optical cavity or resonator, together with an optical switch that may be formed by an electro-optic modulator. The number of round trips in the resonator can be controlled with the optical switch, and when this number is large a high overall amplification factor can be achieved.

Laser light can also be amplified by Raman amplification. Raman amplification is the absorption of photons from a pumped signal to a seed signal that are then immediately re-emitted as lower-frequency laser-light photons ("Stokes" photons) by a process called stimulated Raman scattering. The difference between the two photon energies, the pump signal, and the seed signal, is fixed and corresponds to a vibrational frequency of the gain medium. This makes it possible, in principle, to produce arbitrary laser-output wavelengths by choosing the pump and seed signal wavelength appropriately.

Typically, a population inversion is first created forming a laser emission, or the pumped laser signal. The emission is thereafter amplified via a Raman amplifier. In the current state of the art the Raman amplifier is outside of the optical cavity and not all the energy of the pumped laser signal is transferred to the seed signal. While the seed signal is amplified a degree of inefficiency exists, leaving a residual pumped laser signal. That is, there remains energy in the pumped laser signal that is unused and normally discarded.

What is needed is an amplification system in which residual pumped laser signal is capture and utilized to assist in the amplification process. Moreover, a system is needed by which a seed signal of an of appropriate wavelength and temporal profile can be introduced to a Raman amplifier, and thereafter resonated to produce an output with a selectable wavelength and temporal profile. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

An optical seed signal of appropriate wavelength and temporal profile is introduced to a resonating Raman amplifier thereby providing an optical output having a selectable wavelength and temporal profile. The use of an appropriate seed enhances the brightness of the output. As brightness is a measure of the quality of the light beam and high brightness beams travel farther with less spreading and can be focused to deliver a greater amount of optical power to a small spot, the present invention enables a user to select desired output characteristics based on implementation profiles.

The resonating amplification system of the present invention configures a Raman amplifier within a shared optical cavity thereby improving the amplification process by which power and energy are efficiently transferred from a laser pump source to a separate optical signal source, i.e., a seed.

In one embodiment of the present invention, a resonating optical amplifier, includes a laser pump cavity defined by a first mirror and a second mirror with a laser pump gain medium configured within a first portion of the laser pump cavity. A circulating pump-laser light is introduced to the laser pump gain medium forming a pump signal that is configured to bi-directionally propagate along a beam path within the laser pump cavity. Lastly, the resonating optical amplifier includes a Raman amplifier within a second portion of the laser pump cavity positioned in line with the beam path and operable to impart gain on a seed pulse. The seed pulse and the pump signal are co-aligned and linearly polarized.

In another embodiment of the present invention the resonating optical amplifier of includes a Q-switch configured within the laser pump cavity and aligned with the beam path. While one version of the resonating optical amplifier of the present invention creates a pulsed pump signal another employs a continuous wave as the pump signal. In both instances Raman interaction occurs in the Raman amplifier during propagation and counter-propagation of the pump signal (pulse or continuous wave) and propagation of the seed pulse. The injection of the seed pulse and the pump signal to the Raman amplifier can, in one version of the invention, be synchronized to be substantially concurrent. In one version of the present invention the seed pulse and the pump pulse are configured to transient the Raman amplifier in opposite directions at substantially the same time while in another version the seed pulse and the pump pulse are configured to transient the Raman amplifier in the same directions at substantially the same time.

Another feature of the present invention is the configuration of the optical cavity to possess a second mirror having high transmissibility of the seed pulse and low transmissibility of the pump signal. In doing so the energy from the pump that is not exchanged to the seed in the Raman gain media is retained within the optical cavity, while energy transferred to the seed signal is generated as an output.

Beyond a system, as described herein, one aspect of the present invention includes a method for resonating optical amplification. The methodology includes defining a laser pump cavity by a first mirror and a second mirror wherein both mirrors are highly reflective of a pump signal and yet transmissive of the seed signal post amplification from a Raman gain media. The method further includes configuring a laser pump gain medium within a first portion of the laser pump cavity thereby forming a pump signal from bi-directionally propagating a circulating pump-laser light through the laser pump gain medium along a beam path. Imparting a gain on a seed pulse along the beam path by a Raman amplifier completes the process. As described above, the Raman amplifier is configured within a second portion of the laser pump cavity, the second portion of the laser pump cavity overlapping part of the first portion of the laser pump cavity and aligned with the beam path with the seed pulse and the pump signal being co-aligned and linearly polarized.

While the method for resonating optical amplification of the present invention can use a continuous wave as a pump signal, another version of the methodology employs Q-switching technology creating a pulsed pump signal. In each case the method initiates Raman interaction in the Raman amplifier during propagation and counter-propagation of the pump signal and propagation of the seed pulse.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1A:
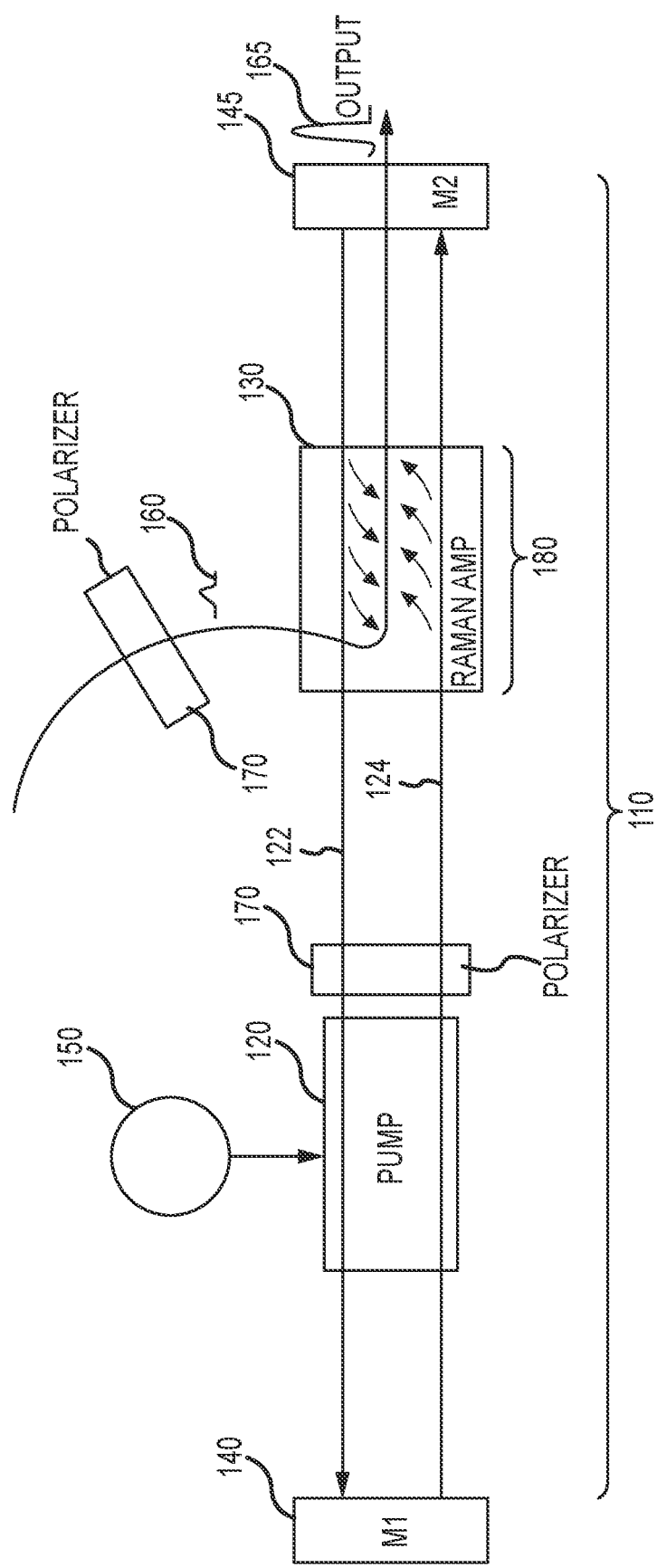
FIGS. 1A and 1B present a high-level system diagram of a resonating optical amplifier according to one embodiment of the present invention.

The Figures depict embodiments of the present invention for purposes of illustration only. Like numbers refer to like elements throughout. In the figures, the sizes of certain lines, layers, components, elements, or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

An optical seed signal of appropriate wavelength and temporal profile is introduced to a resonating Raman amplifier thereby providing an optical output having a selectable wavelength and temporal profile. The use of an appropriate seed enhances the brightness of the output using Raman amplification. As brightness is a measure of the quality of the light beam and high brightness beams travel farther with less spreading, the present invention enables a user to select desired output characteristics based on implementation profiles.

The resonating amplification system of the present invention configures a Raman amplifier within a shared optical cavity thereby improving the amplification process by which power and energy are efficiently transferred from a laser pump source to a separate optical signal source, i.e., the seed.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

A Raman amplifier shares a resonating cavity thereby capturing residual energy of a pumped signal for further amplification while producing a selectable wavelength and temporal profile output from an appropriate seed. In one embodiment of the present invention, with reference to FIG. 1A, a resonating Raman amplification system 100 includes an optical (resonating) cavity 110 shared by a laser gain medium 120 and a Raman gain medium 130 (Raman amplifier). A pair of mirrors 140, 145 defines an optical cavity 110 in which both mirrors 140, 145 are highly reflective of a pump laser light signal incident on its surface while being transmissive to an amplified seed signal. In one instance of the present invention a first mirror 140 is configured to have peak reflectance (0% transmissivity) for a pump light signal wavelength at 1030 nm. A second mirror 145 shares peak reflectance at the pump light signal wavelength of 1030 nm, or the like, incident on its surface while simultaneously possessing high transmissivity for larger wavelengths such as 1080-2000 nm. An energy source 150 such as a circulating pump laser light initiates an energy inversion in the laser pump medium 120. In another version of the present invention a pulse 160 is provided or injected on the beam path, such as from a laser source (e.g., a small laser diode, a short-cavity fiber laser, a solid-state laser, a mode-locked laser, or the like not shown in FIG. 1) used to provide a pulse to the pump the laser gain medium.

The specific arrangement of the amplification mechanism or components of the present invention is not limiting and is used to provide amplification of optical pulses such as pulses with ultrashort pulse durations in the picosecond or femtosecond domain. In one instance a laser pump medium 120 of Ytterbium (Yb) receives energy from an energy source 150 creating a state of inversion. Other sources of energy and sources of a pumped laser signal are possible and consistent with the concepts of the present invention presented herein. Indeed, the optical components may include gain media (such as a direct-bandgap semiconductor, a laser crystal or glass such as Ti:sapphire, Nd:YAG, Yb:YAG, or Yb:glass, a ceramic gain media, laser dyes, gases or gas mixtures, or other useful gain media) that may be pumped to accumulate a desired amount of energy. As light is emitted from the laser gain medium 120 it resonates between the two mirrors 140, 145 along a beam path that coincides with a Raman amplifier 130. Indeed, the Raman amplifier 130 resides within the optical cavity 110.

Another aspect of the present invention is that light resonating throughout the optical cavity 110 is a linearly co-aligned polarized light. As is well known, light is an electromagnetic wave, and the electric field of this wave oscillates perpendicularly to the direction of propagation. Light is unpolarized if the direction of this electric field fluctuates randomly in time. Many common light sources such as sunlight, halogen lighting, LED spotlights, and incandescent bulbs produce unpolarized light. Linearly polarized light is when the electric field of light is confined to a single plane along the direction of propagation. Linearly co-aligned polarized light is when light is confined to the same singular plane. Co-aligned, linearly polarized light enables strong interaction between the pump and Raman signals thereby enhancing amplification.

The present invention includes one or more polarizers 170 or waveplates to orient the pumped laser signal and the Raman amplification seed to be linearly co-aligned. Polarizers can be broadly divided into reflective, dichroic, and birefringent polarizers. Reflective polarizers transmit the desired polarization while reflecting the rest. Wire grid polarizers are a common example of this, consisting of many thin wires arranged parallel to each other. The light that is polarized along these wires is reflected, while light that is polarized perpendicular to these wires is transmitted. Other reflective polarizers use Brewster's angle. Brewster's angle is a specific angle of incidence under which only s-polarized light is reflected. The reflected beam is s-polarized, and the transmitted beam becomes partially p-polarized. Dichroic polarizers absorb a specific polarization of light, transmitting the rest; modern nanoparticle polarizers are dichroic polarizers. Lastly, Birefringent polarizers rely on the dependence of the refractive index on the polarization of light. Different polarizations will refract at different angles, and this can be used to select certain polarizations of light. While polarizers select certain polarizations of light, discarding the other polarizations, ideal waveplates modify existing polarizations without attenuating, deviating, or displacing the beam.

In accordance with one embodiment of the present invention, an energy source 150, such as circulating pump laser light, introduces light to the laser pump gain medium 120. The light travels along the beam path, through the gain medium 120 (occupying a first portion of the optical cavity), as defined by the first and second mirrors 140, 145. As the light travels between the two mirrors 140, 145 the light is linearly polarized by a polarizer 170 or waveplate along a single plane. A second portion 180 of the optical cavity 110 and aligned with the beam path is a Raman gain medium 130, aka a Raman Amplifier.

A seed pulse signal 160, linearly polarized along the same plane as the pump signal, is introduced into the Raman amplifier 130 along the same beam path. As the Raman gain medium resides within the optical cavity 110 the pump signal propagates and counter-propagates through the Raman amplifier. As the seed signal 160 passes through the Raman amplifier 130, energy is immediately transferred from the propagating pump signal and the counter-propagating signal. The Raman gain medium transfers power from the pump to the seed signal via the Raman nonlinear optical scattering process. As the seed signal exits the Raman amplifier as an output 165 its wavelength is such as to be substantially transparent to the second mirror 145.

In the case shown in FIG. 1A, the seed pulse 160 exits the optical cavity 110 through the second mirror 145, just as the forward propagation of the pump signal 124 is reflected toward to the laser gain medium 120 as a counter-propagating signal 122. The reflected pump signal 122, reduced in power due to the transfer to the seed pulse, is replenished by traversal through the laser gain medium 120. The process is repeated during each cavity round trip. Power is transferred from the pump signal 122, 124 to the seed pulse 160 in either direction through the Raman amplifier 130 within the optical cavity 110. It is in this way that the Raman gain region and the pump laser "share" the cavity.

Figure 1B:
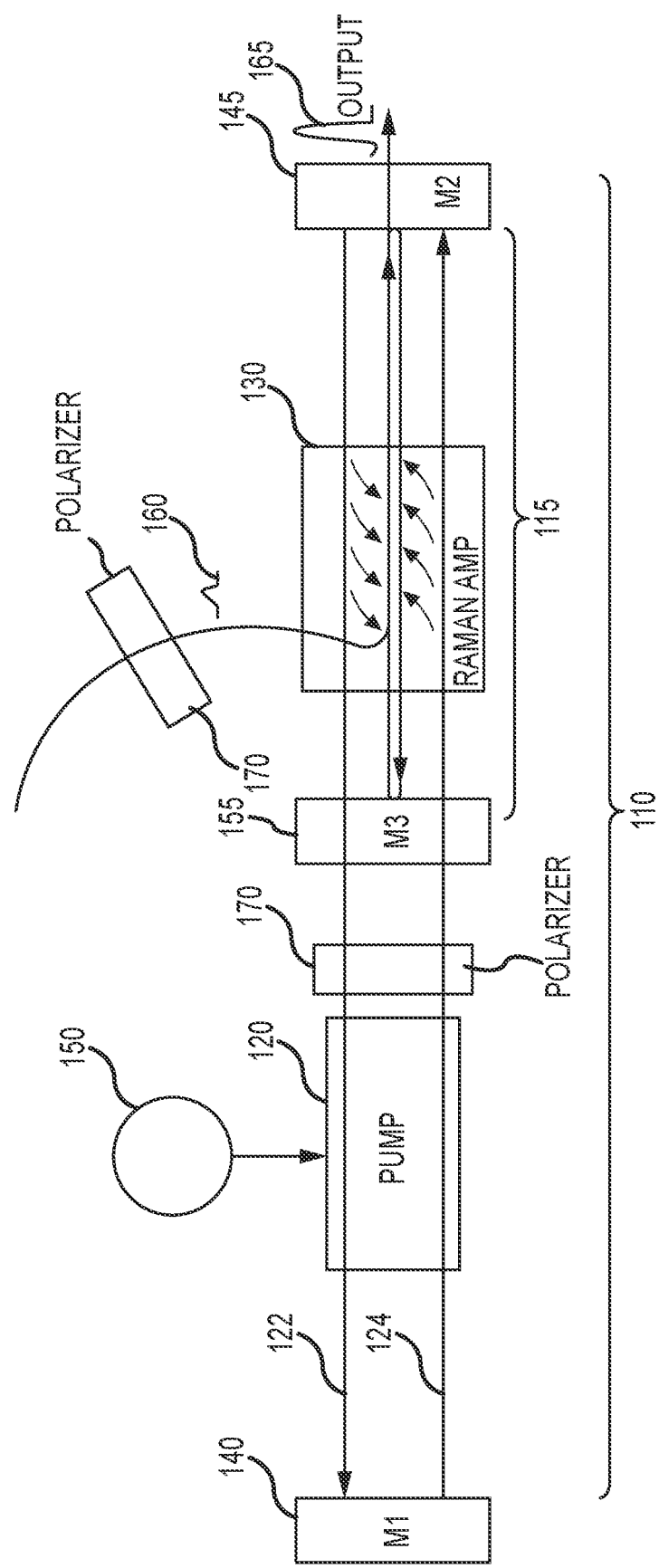

Shared resonating is also illustrated in another embodiment of the present invention shown in FIG. 1B. In this instance the optical cavity 110, defined by a first mirror 140 and second mirror 145, is shared by a Raman resonating cavity 115. A third mirror 155 is interposed between the first mirror 140 and the second mirror 145 having high transmittance for the pump laser light while maintaining high reflectance for the seed laser light. In doing so the Raman amplifier 130 and the pump 120 are both resonating with their cavities 110, 115 overlapping, co-aligned and linearly polarized. In doing so the resonator and gain medium used to generate the pump signal are the same as the resonator and gain medium used to amplify the seed.

The shared resonation configuration of the present invention improves seed signal amplification. The Raman gains medium transfers power from the pump signal to the seed pulse via the Raman nonlinear optical scattering process and as the process is repeated during each cavity round trip, power can be transferred from pump to signal in either direction through the cavity.

The efficiency and optical gain of the Raman power transfer process is increased as the pump power is increased. This shared cavity configuration provides higher pump power, since it is intra-cavity and is not required to be out coupled through a partially reflecting mirror as is normally the case for an external laser pumped Raman amplifier. The intra-cavity power of a laser is generally greater than that of an emitted beam due to the requirement of a partially reflecting mirror needed to form the cavity.

Moreover, an increased efficiency of power transfer occurs due to better spatial, and temporal (when pulsed) overlap between the two signals. This configuration of the present invention provides an automatic and convenient method to implement bi-directional pumping of the seed pulse and as well as providing good temporal overlap of the pump signal with the seed pulse (synchronous pumping). In one version of the present invention, the length of the optical cavity may be adjusted by moving one or both mirrors to modify or set the length of the optical path. The pulses, in this regard, are injected at opposite ends or ports of the cavity such that energy transfer occurs during propagation and counter-propagation of the pulses, and the level of gain is increased by having the seed pulse transit through the Raman gain media at least twice and to interact with a pump pulse on each such transit.

The Raman amplifier 130 may take the form of a plasma chamber or be provided as nearly any useful type of Raman cell. In one embodiment, the Raman amplifier includes a Raman media that uses a gas or liquid for the Raman amplification. This is a useful embodiment for obtaining a specific wavelength shift during the Raman interaction between the input pulse 160 and the pump signal 122, 124 in the Raman amplifier 134. For example, a specific gas may be chosen for use in a Raman amplifier to obtain a desired wavelength shift in the Raman seed pulse that is being amplified in the system. In another embodiment, the Raman amplifier uses plasma for the Raman amplification. As with the use of a gas or liquid, the use of plasma in a Raman cell or in a plasma chamber is effective for obtaining a particular wavelength shift in the Raman amplifier that depends on the electron density of the plasma. In each of these embodiments, the Raman amplifier is used to provide amplification within the optical cavity and, in addition, to gain energy due to such interaction, the amplifier is used to achieve a desired wavelength shift in the output pulse by selecting the gain medium in the Raman amplifier.

The amplification system of the present invention may also include one or more devices for synchronizing interaction between the pump gain media and Raman amplifier. For example, pulses may be synchronized by controlling the timing of injection of the pulses/signals into the Raman amplifier. In addition to these controllers or mechanisms, a mechanism or mechanisms may be provided to vary or tune the time in the optical cavity. For example, mechanisms may be provided for varying or setting the position of one or more of the cavity end mirrors and to set the cavity length (e.g., to adjust the length of the resonator). Such mechanisms may include an optical feedback system (not shown) for positioning the mirrors and/or timing circuitry for determining roundtrip travel time of the pulses in the amplifier cavities or on optical paths. This tuning of the cavity length is useful for synchronizing times at which the counter-propagating or co-propagating pulses enter the Raman gain media providing for more interaction.

The configuration of the present invention implements a multi-pass configuration that enables more pump power to be converted to seed pulse power because the pump signal is replenished, after depletion due to the power transfer to the seed, in the laser gain medium region during each pass in the cavity.

The seeded Raman amplifier of the present invention converts relatively low brightness optical pump signals into high-brightness optical output signals over a broad range of wavelengths and pulse durations. A seed pulse can be amplified by a Continuous Wave (CW) pump or by a pulsed pump laser. As the temporal profile of the output signal is determined by the seed signal, the present invention allows for generation of ultra-short optical pulses (USP) from the short-wave infrared region to the long-wave infrared. Power accumulation at specific wavelengths can be achieved by using spectral filtering within the gain media to suppress the generation of longer-wavelength Raman signals, and the output wavelength can be selected by proper choice of spectral filter and the seed pulse. The configuration can be implemented in optical fiber to provide a compact device, and the same process is used for all output wavelengths.

Figure 2A:
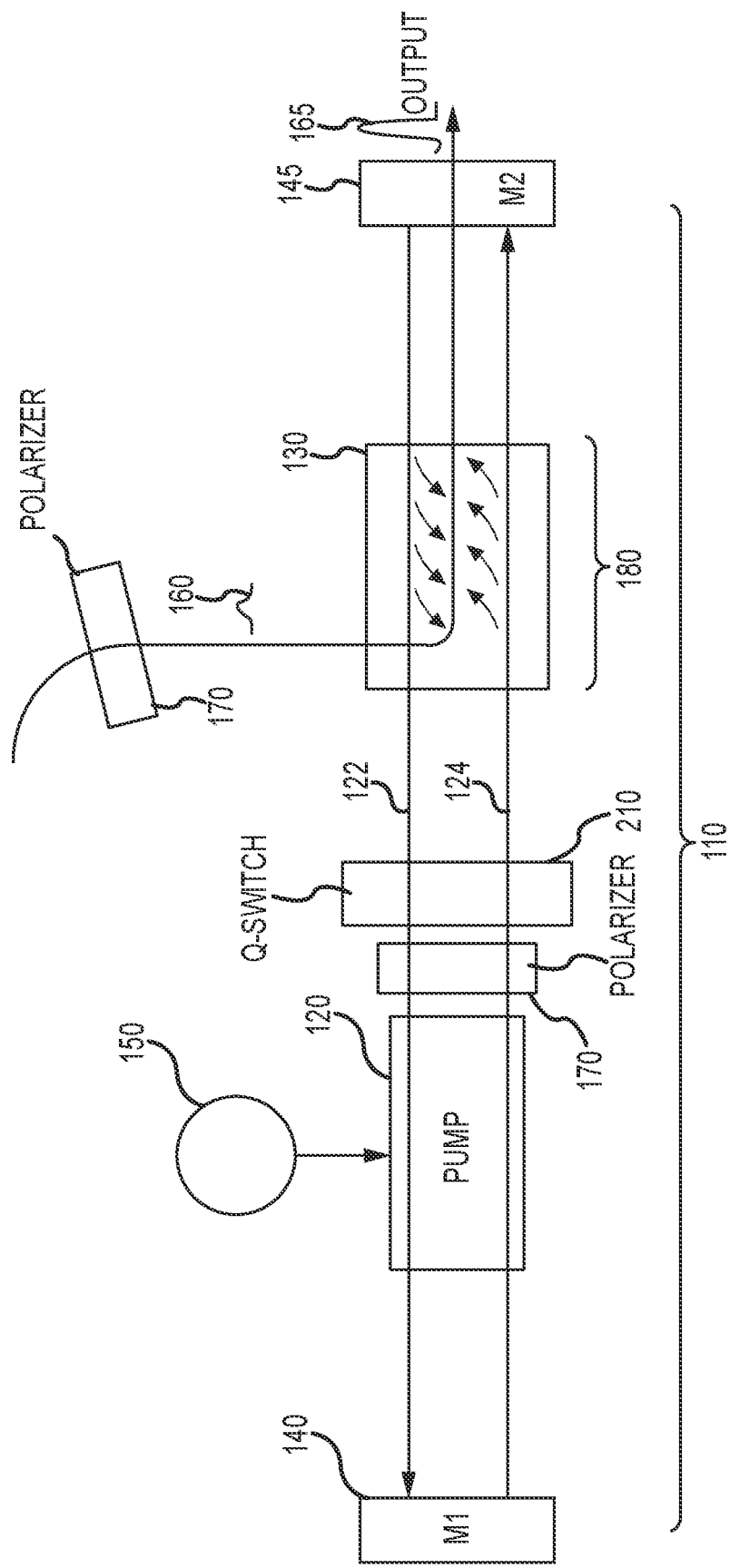
FIGS. 2A and 2B presents a high-level system diagram of a resonating optical amplifier according to another embodiment of the present invention incorporating Q-switching technology to enhance power exchange and output.

Another aspect of the present invention as seen with reference to FIG. 2A. Includes one or more Q-Switches 210. Q-switching, or quality switching, of a laser, is a mechanism used to control the light output by concentrating all the energy into intense bursts or series of pulses by modulating the intracavity losses, the so-called Q-factor of the laser resonator.

Q-switching, sometimes known as giant pulse formation or Q-spoiling, is a technique by which a laser can be made to produce a pulsed output beam. The technique allows the production of light pulses with extremely high (gigawatt) peak power, much higher than would be produced by the same laser if it were operating in a continuous wave (constant output) mode. Compared to mode locking, another technique for pulse generation with lasers, Q-switching leads to much lower pulse repetition rates, much higher pulse energies, and much longer pulse durations.

With active Q-switching, the Q-switch is an externally controlled variable attenuator. This may be a mechanical device such as a shutter, chopper wheel, or spinning mirror/prism placed inside the cavity, or (more commonly) it may be some form of modulator such as an acousto-optic device, a magneto-optic effect device or an electro-optic device—a Pockels cell or Kerr cell. The reduction of losses (increase of Q) is triggered by an external event, typically an electrical signal. The pulse repetition rate can therefore be externally controlled. Modulators allow for a faster transition from low to high Q and provide better control. Alternatively, when the modulator is in its low-Q state, an externally generated beam can be coupled into the cavity through the modulator. This can be used to "seed" the cavity with a beam that has desired characteristics (such as transverse mode or wavelength). When the Q is raised, lasing builds up from the initial seed, producing a Q-switched pulse that has characteristics inherited from the seed.

In another embodiment, passive Q-switching is implemented. In this case, the Q-switch is a saturable absorber, a material whose transmission increases when the intensity of light exceeds some threshold. The material may be an ion-doped crystal-like Cr:YAG, which is used for Q-switching of Nd:YAG lasers, a bleachable dye, or a passive semiconductor device. Initially, the loss of the absorber is high, but still low enough to permit some lasing once a large amount of energy is stored in the gain medium. As the laser power increases, it saturates the absorber, i.e., rapidly reduces the resonator loss, so that the power can increase even faster. Ideally, this brings the absorber into a state with low losses to allow efficient extraction of the stored energy by the laser pulse. After the pulse, the absorber recovers to its high-loss state before the gain recovers, so that the next pulse is delayed until the energy in the gain medium is fully replenished. The pulse repetition rate can only indirectly be controlled, e.g., by varying the laser's pump power and the amount of saturable absorber in the cavity. Direct control of the repetition rate can be achieved by using a pulsed pump as well as passive Q-switching.

Figure 2B:
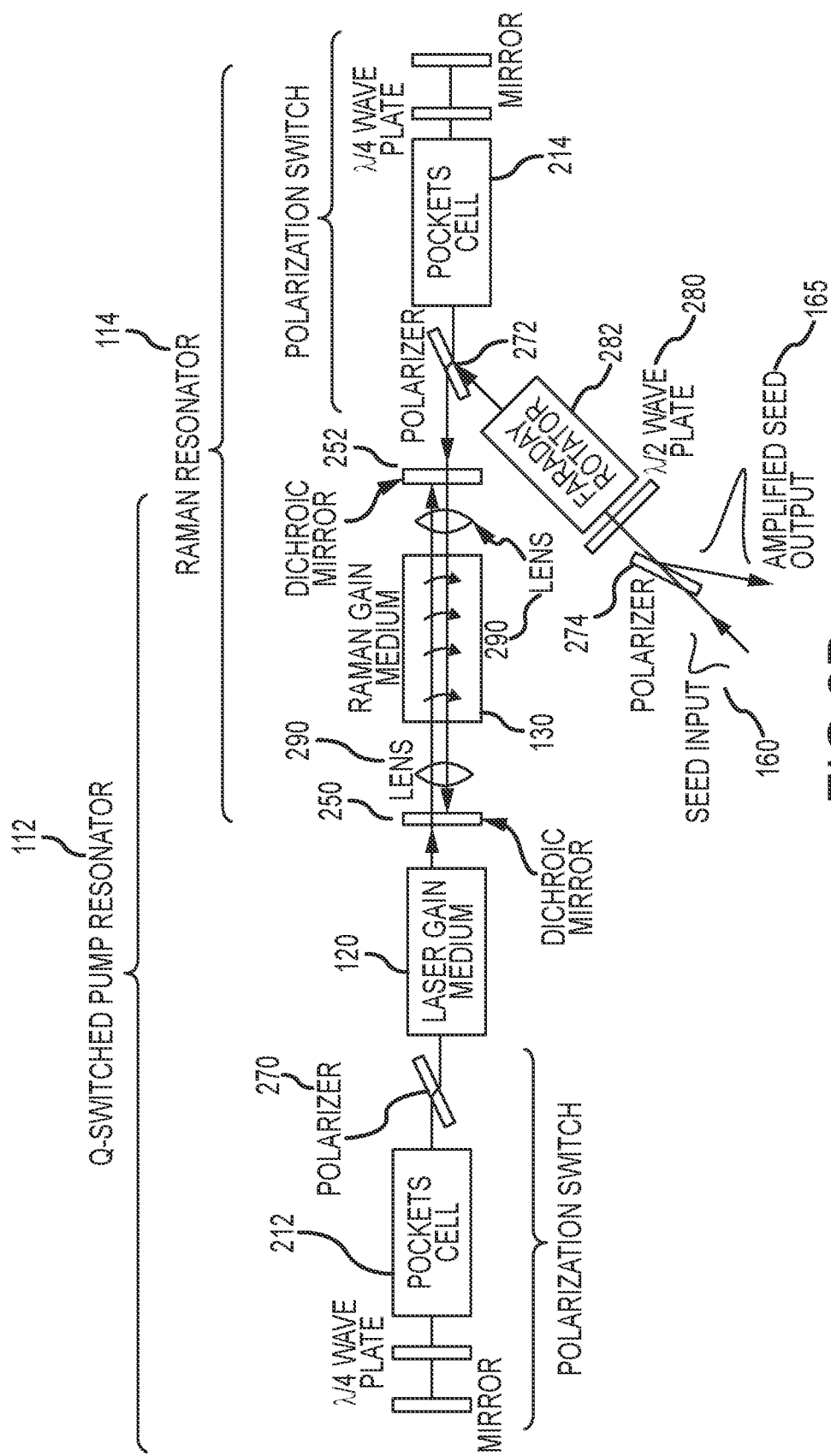

Another configuration of the present invention's implementation of overlapping resonating cavities is shown in FIG. 2B. In this version of the present invention the left-hand Pump resonator 112 creates a high-power optical pulse by means of Q-switching (Pockets Cell) 212. This Pump resonator 112 overlaps the right-hand Raman resonator 114 used to amplify a seed pulse 160 by means of the Raman effect. In the Pump resonator 112, a first polarization switch 270 is used to attenuate circulating light while the gain medium 120 is storing up energy. When the energy build-up is complete, the state of the switch 270 is changed to allow transfer of energy to a circulating light pulse. The light pulse transmits through a first dichroic mirror 250 to enter the overlap region that contains the Raman Gain medium 130.

In the Raman resonator 114, a second polarization switch 272 is used to insert the seed pulse 160 into the resonator 114. The seed pulse 160 transmits through a second dichroic mirror 252 and enters the Raman gain medium 130, where it is amplified by the pump. The second polarization switch 272 is used to direct the amplified signal out of the Raman resonator 114 after the seed 160 has made multiple round trips. The combination of an angle polarizer 274, a half wave plate 280, and a Faraday rotator 282 is used to steer an amplified seed pulse 165 in an output direction that is distinct from the input path. Lenses 290 are used to focus the pump into the Raman gain medium 130, creating higher power density and increasing the amount of Raman gain.

The use of two Pockels cells 212, 214, one for each cavity, allows for independent timing control of the seed injection versus the circulating light build up within the pump cavity. This is highly advantageous in that the seed injection temporal overlap and conversion efficiency can be optimized.

Figure 3:
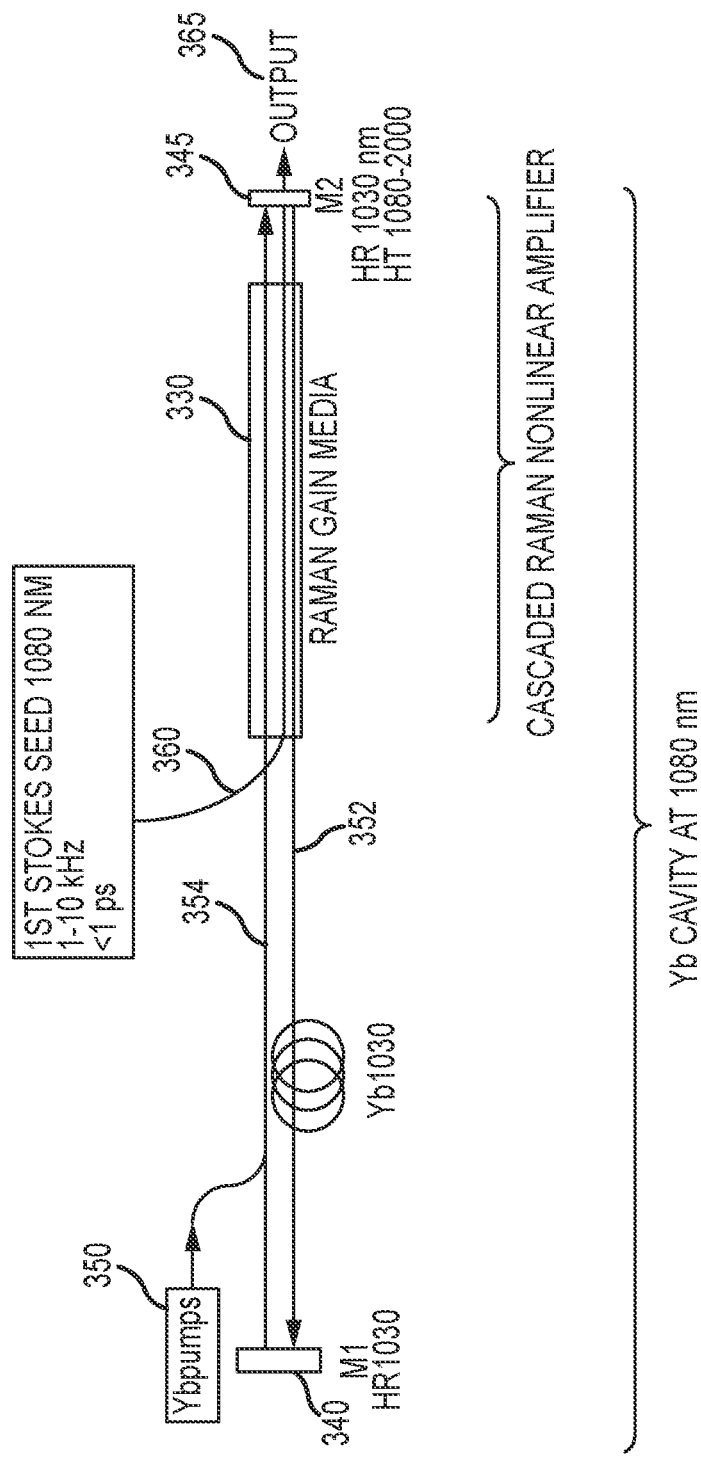
FIG. 3 shows an example of a resonating optical amplifier according to one embodiment of the present invention for a Yb based pump with a 1080 nm seed pulse presented to the Raman nonlinear gain media.
Figure 4A:
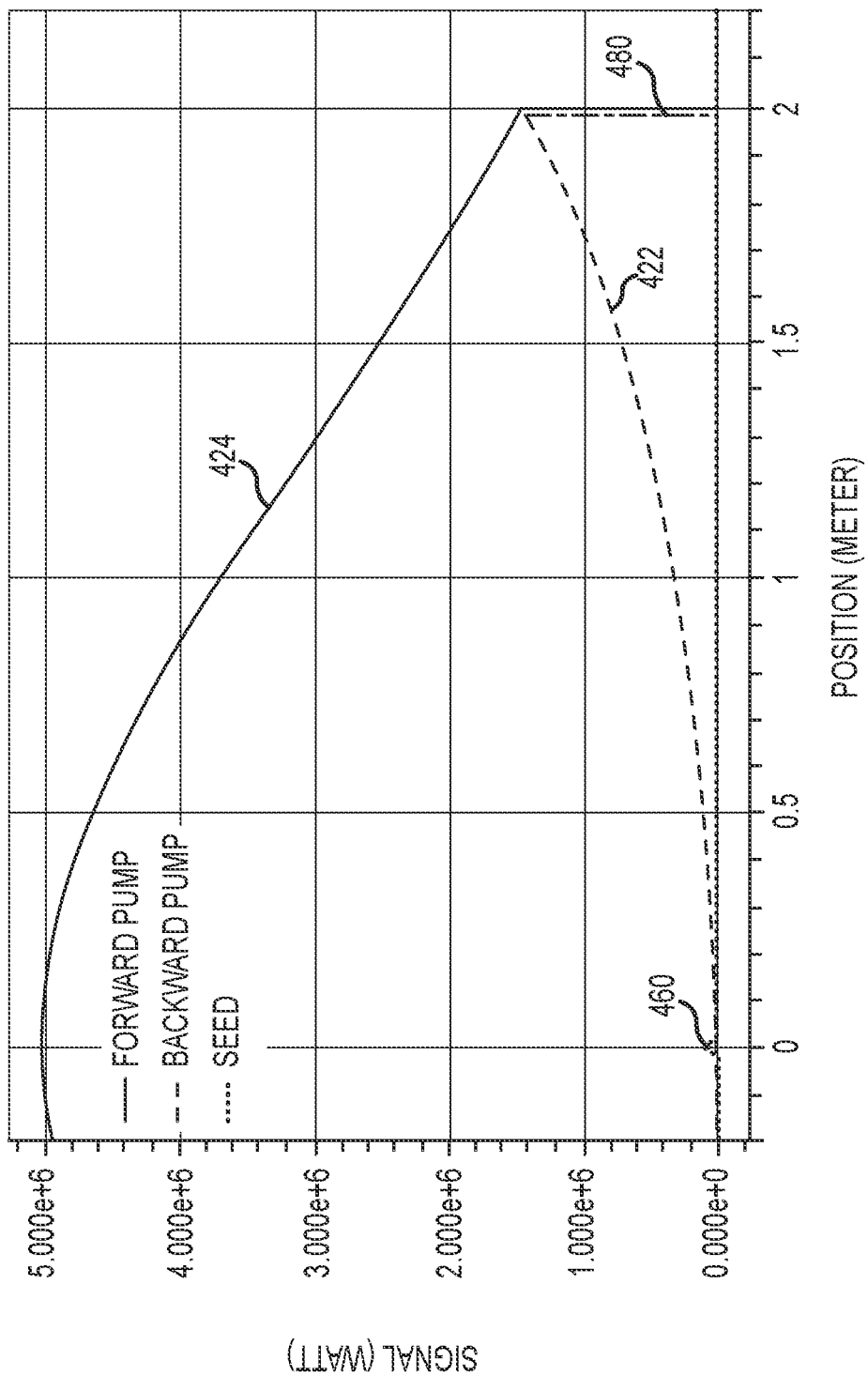
FIGS. 4A-4F illustrates the energy exchange between of the resonating optical amplifier of the present invention to a seed pulse in the Raman amplifier from propagating and counter-propagating pump signals.
Figure 4B:
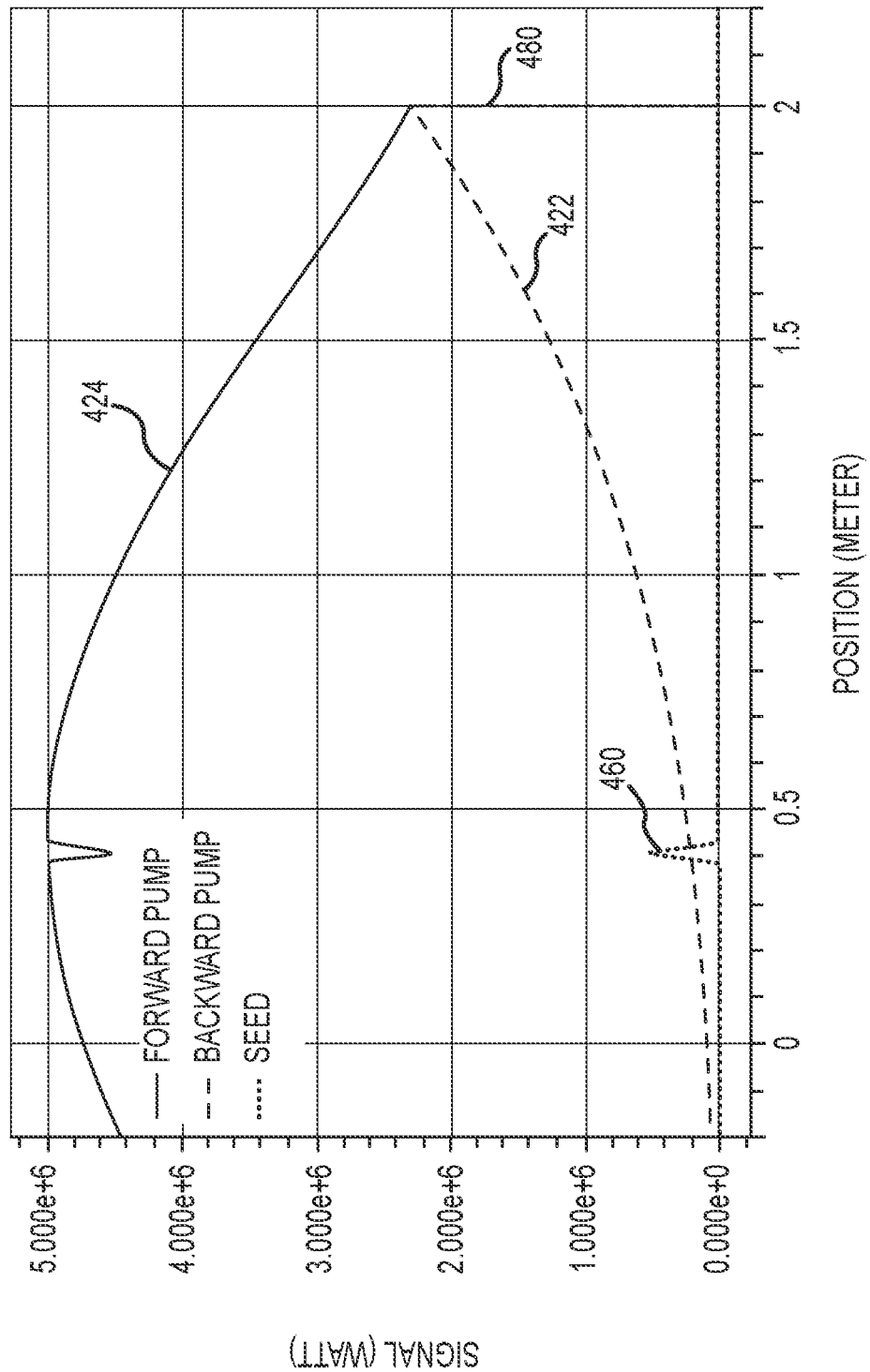
Figure 4C:
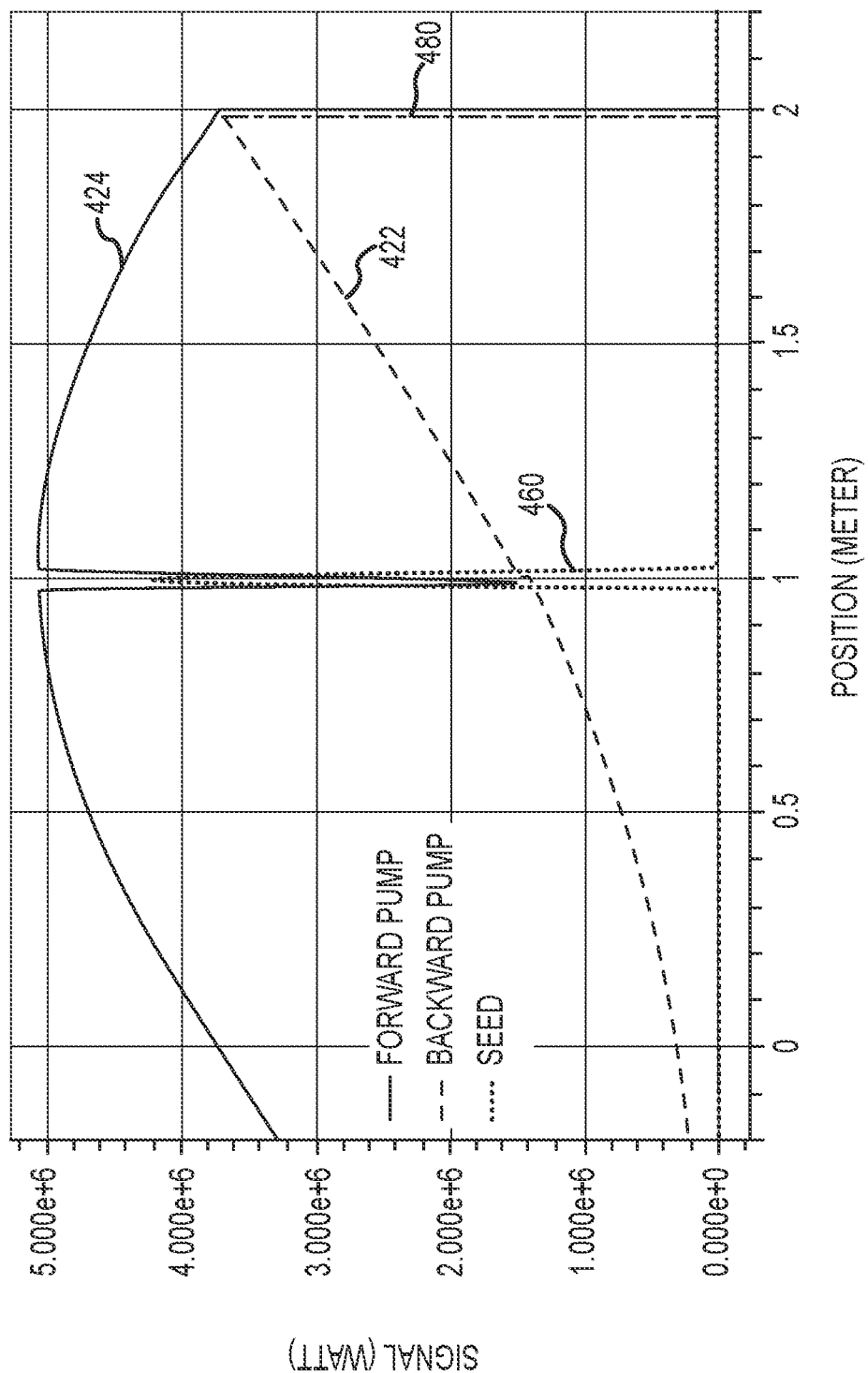
Figure 4D:
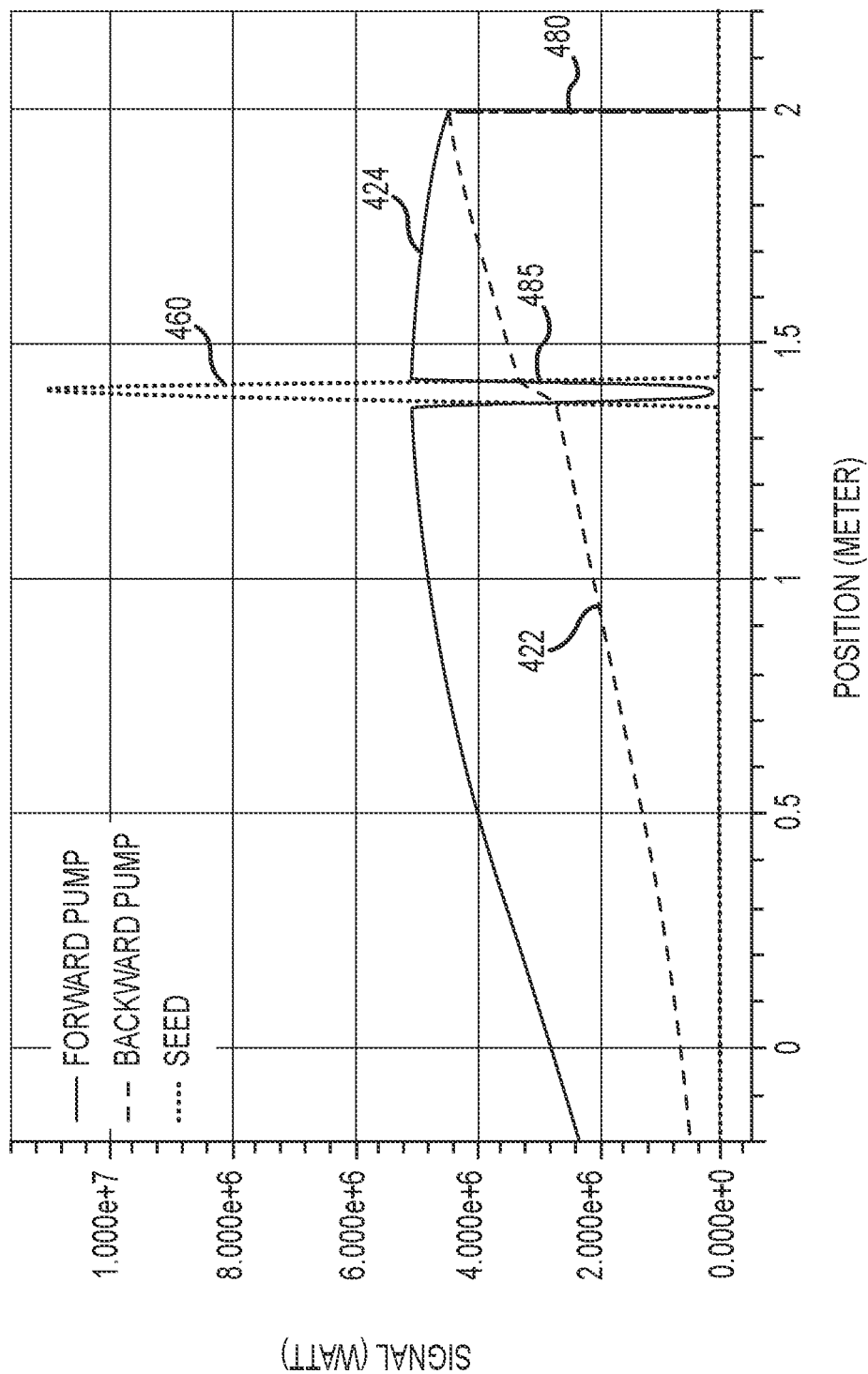
Figure 4E:
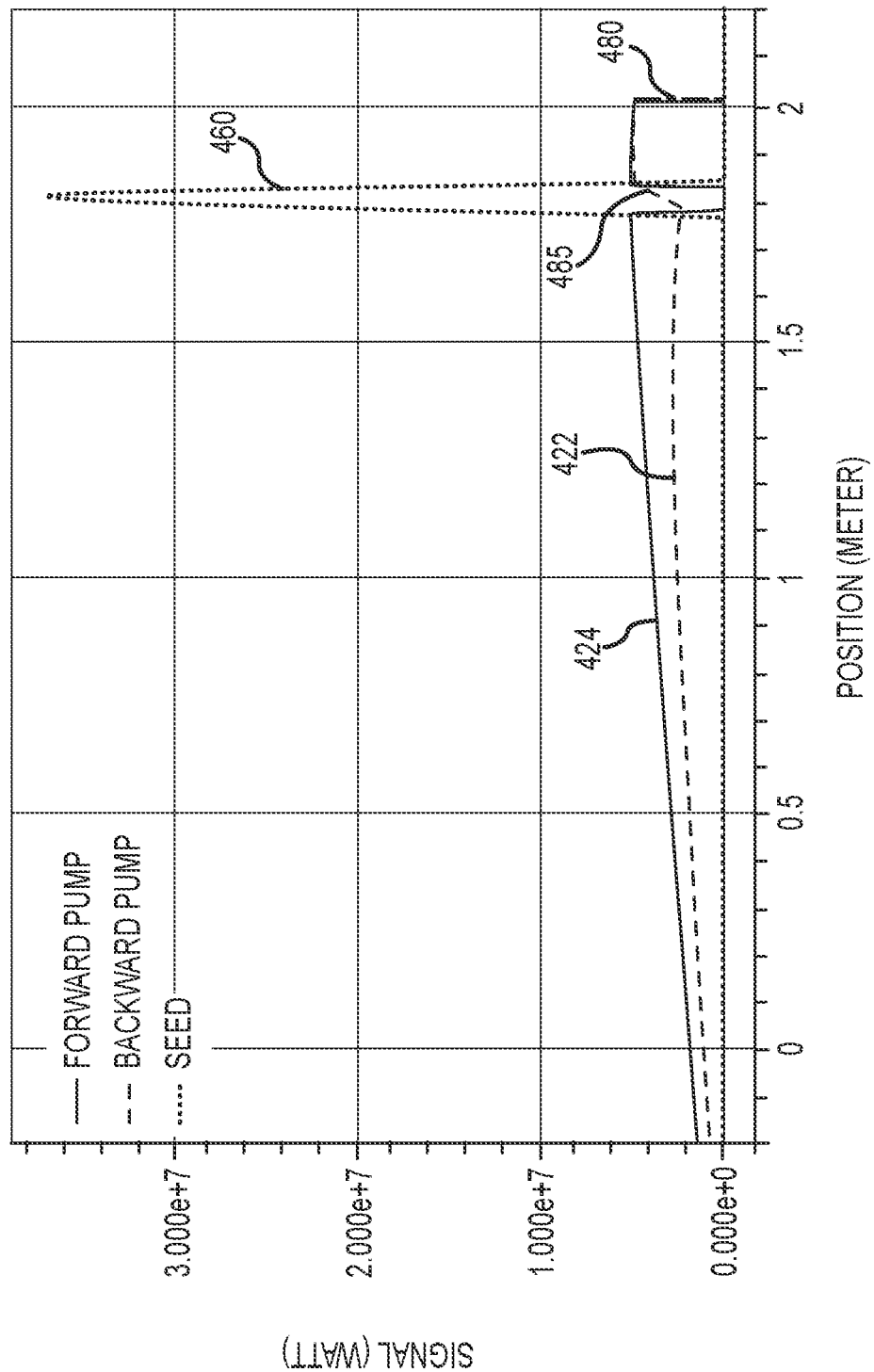
Figure 4F:
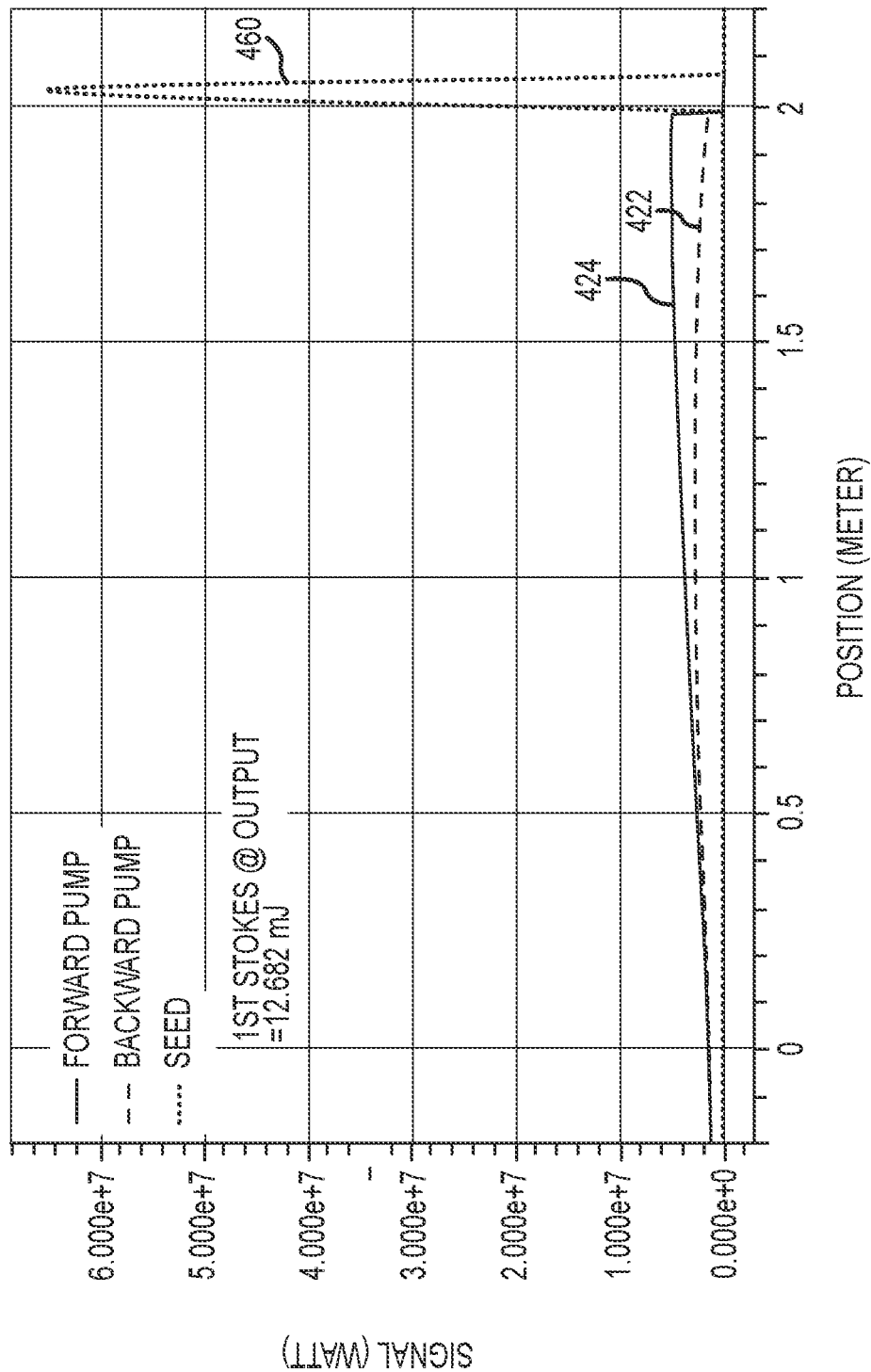

In one implementation of the shared cavity configuration of the present invention and with reference to FIG. 3, the pump laser 352, 354 is a continuous wave or pulsed Yb-doped fiber laser 350 with a resonator that extends from highly reflective optical component or mirror at one end 340 to highly reflective optical component or mirror at the other end 345. Other configurations consistent with this disclosure are possible and indeed contemplated. In this case, both reflectors have reflection peaks at 1030-nm, which leads to lasing at 1030-nm. The reflectors are made near 100% at 1030-nm reflecting to keep the 1030-nm pump light in the cavity and to achieve high intra-cavity power. Fiber, in this instance, is made of fused silica to provide for strong Raman amplification 330 of a seed signal 360 at a wavelength of 1080-nm. The injected seed signal 360 passes through the Raman gain media 330 (also optical fiber in this realization) and leaves the device as output 365 light passing through the right-hand mirror 345.

FIGS. 4A-4F illustrate the transfer of power from the propagating and counter-propagating pump signal to a seed pulse. In this example, the pump seed 460 is injected into the Raman amplifier at t=0 and position 0 (the position being a relative linear position within the Raman amplifier portion of the optical cavity). The seed pulse 460 is represented by a dotted line. The upper line in each figure represents the propagating pump signal 424 moving in the same direction as the seed pulse. In this instance the propagating pump signal 424 is injected into the Raman amplifier just prior to the seed pulse 460 such that the seed pulse 460 is centered within the pump signal. The vertical dash-dot-dash line 480 at the right most portion of the graph indicates the end of the Raman gain media, coincident with the second mirror interface.

The lower dashed line shows the reflected or counter propagating pump signal 422. As the seed pulse 460 moves through the Raman gain media, the seed pulse 460 gains energy from both the propagating 424 and the counter-propagating 422 pump signal.

FIG. 4A-4F show the transfer of optical power within a shared resonator Raman amplifier for the configuration where a seed pulse 460 is amplified during a single pass of a 2-meter-long optical fiber serving as the Raman gain medium. A 15-nanosecond, 40-millijoule propagating pump signal 424 is indicated by the upper solid line. The seed pulse 460 that is initially 100 picoseconds in duration and has an initial energy of 10 microjoule, indicated by dotted line, moves from left to right through the Raman gain media. The centers of the pump signal 424 and seed pulse 460 (locations of peak power for the pulses) coincide as the pulses enter and initially co-propagate from left to right along the optical fiber.

The counter-propagating pump signal 422 that propagates from right to left. As the co-propagating pulses traverse the fiber, a dip 485 (clearly shown in FIG. 4D) forms in the temporal profile of the pump signal as optical power are transferred to the seed pulse at locations where the pulses overlap. As shown, a step 485 forms in the counter-propagating reflected pump signal 422 as power is transferred to the seed pulse 460. The overall transfer of optical power is enhanced because of the interaction of the seed 460 with both co-propagating 424 and counter-propagating 422 portions of the pump signal. In this instance, the final seed energy of the seed is 12.5 millijoule, the energy gain is 31 dB, and the power conversion efficiency is 31%.

In the system of the present invention, the optical cavity of the amplifiers is defined in part by cavity end components which may be mirrors or may take different forms. For example, one or both cavity end components may take the form of diffraction grating (or another dispersion element) and such grating may be tunable to all for independent tuning of the wavelengths of pulses on the optical paths. In other cases, one or both components may include a chirp mirror to provide pulse shaping. In yet other embodiments, one or both components may include a SAM mirror ("saturable absorber mirrors"; e.g., a mirror combined with a Q switch). The above embodiments show and describe various means for implementing the utility of laser pulse amplification. The invention, however, is not limited to any embodiment as each embodiment (or various combinations and/or modifications thereof) may provide certain advantages based on a requisite implementation or design. In this regard, the above utility provides certain advantages not previously attainable. For example, the optics used in prior regenerative amplifiers generally had peak power damage thresholds that may be exceeded by perturbations in the beam as it transits the optical path. In these cases, the optics may be damaged and thereby cause loss in efficiency of a resonating amplifier. Another exceptionally unique aspect of the invention regards its "power tunability". For example, overall pulse amplification of the prior laser systems generally relied solely on the energy of the pump laser to increase the gain of an output laser pulse. While the utility described herein may also use a pump laser for laser pulse application, amplification of the output laser pulses is now tunable according to the wavelength of the Raman amplifier.

While there have been described above the principles of the present invention in conjunction with a resonating optical amplifier, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A resonating optical amplifier, comprising:
   a laser pump cavity defined by a first mirror and a second mirror wherein the first mirror is movable thereby operable to modify a length of the laser pump cavity;
   a laser pump gain medium configured within a first portion of the laser pump cavity;
   a circulating pump-laser light configured to bi-directionally propagate through the laser pump gain medium along a beam path within the laser pump cavity forming a pump signal; and
   a Raman amplifier, defined by a third mirror and the second mirror, wherein the third mirror is interposed between the first mirror and the second mirror an wherein the Raman amplifier, configured within a second portion of the laser pump cavity, the second portion of the laser pump cavity overlapping with the first portion of the laser pump cavity, operable to impart gain on a seed pulse along the beam path and wherein the seed pulse and the pump signal are co-aligned and linearly polarized and wherein the second mirror has high transmittance for the pump signal while maintaining high reflectance for the seed pulse.

2. The resonating optical amplifier of claim 1, further comprising a Q-switch configured within the laser pump cavity and aligned with the beam path.

3. The resonating optical amplifier of claim 1, wherein the pump signal is a continuous wave.

4. The resonating optical amplifier of claim 1, wherein the pump signal is a pump pulse.

5. The resonating optical amplifier of claim 4, wherein Raman interaction occurs in the Raman amplifier during propagation and counter-propagation of the pump pulse and propagation of the seed pulse.

6. The resonating optical amplifier of claim 4, wherein injection of the seed pulse and the pump pulse to the Raman amplifier is synchronized to be substantially concurrent.

7. The resonating optical amplifier of claim 4, wherein the seed pulse and the pump pulse are configured to transient the Raman amplifier in opposite directions at substantially the same time.

8. The resonating optical amplifier of claim 4, wherein the seed pulse and the pump pulse are configured to transient the Raman amplifier in the same directions at substantially the same time.

9. The resonating optical amplifier of claim 4, wherein the seed pulse and at least one pump pulse are configured to transient the Raman amplifier in the same directions at substantially the same time and wherein the seed pulse and another pump pulse are configured to transient the Raman amplifier in opposite directions at substantially the same time.

10. The resonating optical amplifier of claim 1, wherein the second mirror is configured to have high transmissibility of the seed pulse and low transmissibility of the pump signal.

11. A method for resonating optical amplification, comprising:
    defining a laser pump cavity by a first mirror and a second mirror wherein the first mirror is movable thereby operable to modify a length of the laser pump cavity;
    configuring a laser pump gain medium within a first portion of the laser pump cavity;
    forming a pump signal from bi-directionally propagating a circulating pump-laser light through the laser pump gain medium along a beam path within the laser pump cavity;
    imparting a gain on a seed pulse along the beam path by a Raman amplifier wherein the Raman amplifier is defined by a third mirror and the second mirror and wherein the third mirror is interposed between the first mirror and the second mirror an wherein the Raman amplifier, the Raman amplifier configured within a second portion of the laser pump cavity, the second portion of the laser pump cavity overlapping with the first portion of the laser pump cavity, and wherein the seed pulse and the pump signal are co-aligned and linearly polarized; and
    tuning the laser pump cavity length to synchronize times at which the pump signal enter the Raman amplifier.

12. The method for resonating optical amplification according to claim 11, further comprising initiating Raman interaction in the Raman amplifier during propagation and counter-propagation of the pump signal and propagation of the seed pulse.

13. The method for resonating optical amplification according to claim 11, wherein the pump signal is a pump pulse.

14. The method for resonating optical amplification according to claim 13, further comprising injecting the seed pulse and the pump pulse to the Raman amplifier substantially concurrently.

15. The method for resonating optical amplification according to claim 13, further comprising configuring the seed pulse and the pump pulse to transient the Raman amplifier in opposite directions at substantially the same time.

16. The method for resonating optical amplification according to claim 13, further comprising configuring the seed pulse and the pump pulse to transient the Raman amplifier in the same directions at substantially the same time.

17. The method for resonating optical amplification according to claim 13, further comprising configuring the seed pulse and at least one pump pulse to transient the Raman amplifier in the same directions at substantially the same time and the seed pulse and another pump pulse to transient the Raman amplifier in opposite directions at substantially the same time.

* * * * *